United States Patent Office 3,110,690
Patented Nov. 12, 1963

3,110,690
BIVALENT METAL HYDROXIDE TREATMENT OF DRYING OIL MODIFIED ALKYD RESINS
Lawrence W. Friedsam, Chicago, Ill., assignor to The Sherwin-Williams Company, Cleveland, Ohio, a corporation of Ohio
No Drawing. Filed June 11, 1956, Ser. No. 590,385
15 Claims. (Cl. 260—22)

This invention relates to a method of improving certain phsyical characteristics of modified alkyl resins in solution in an organic solvent by treatment of said alkyd with minor quantities of hydroxide forming bivalent metal ions.

More particularly, this invention relates to a method for the manufacture of modified alkyd resins which comprises adding to the resin in solution in a volatile organic solvent while the acid value of the resin indicates the presence of free carboxyl groups, e.g., acid values above 10 and the cure value is substantially above zero, a minor amount of a hydroxide-forming basically-reactive bivalent metal ion. The quantity of hydroxide-forming basically-reactive bivalent metal ions which are added are sufficient in amount to neutralize, at least in part, said acid value. The reaction is assisted by heating to force combination of the metal and resin and is most conveniently accomplished by heating to the point of reflux of the solvent resin mixture and refluxing the combination until the cure value of the resin approaches zero and the acid value has been measurably reduced.

This invention is also directed to novel compositions of matter which are useful in the coatings art and which comprise volatile organic solvent solution of both air drying and baking type modified alkyd resins, novel in that there is in chemical combination with said resins an amount of a hydroxide-forming basically-reactive bivalent metal ion sufficient to have neutralized, at least in part, the acid value of said resin and to have reduced the cure value of said resin.

The terms "cure value" and "acid value" are used herein as is now established in the art of resin manufacture. The cure value is equivalent to the number of seconds from time of exposure to time of gelation of the modified resin upon exposure in a very thin film under agitation with a fine pointed instrument (a nail will do) on a hot plate which is maintained at a temperature of 392° F. The acid value, or acid number, of an oleoresinous varnish is the number of milligrams of KOH necessary to neutralize the carboxyl groups in one gram of the resin solids.

The principal object of the invention is to bring about combination between a bivalent hydroxide-forming metal ion and a pre-formed drying oil modified alkyd resin to produce a product having a markedly increased drying rate, a reduced acid value, and a cure value which has been reduced to at least less than 10 seconds and most generally to substantially zero value.

Modified alkyd resins treated with basically-reactive bivalent metal hydroxides and oxides as described above, have particularly outstanding value as label coatings or clear varnishes for coating over paper labels. In this use the outstanding characteristic of the varnish is its very rapid dry and its extreme resistance to penetration of the paper even though the paper be of soft and porous nature. Another advantage resides in the extent to which the resin solids may be reduced by further incorporation of volatile hydrocarbon solvents without penetration of the so reduced varnish when applied to paper labels. Other general uses which have suggested themselves and which have been tried and found promising are in the production of traffic zone paints or line marking paints where both good durability and very rapid dry are essential to the end use.

Another promising field for adaptation of coatings altered as herein set out is that of continuous coating of pipe and other cases where products are surface coated continuously at a high lineal rate of production. In such cases it is desirable to coat the product with a finish which dries rapidly in order that the length of the drying room, or the length of the oven in which drying is forced, may occupy minimum space.

Other specialized uses, of course, are inherent in selection of certain species of basically-reactive bivalent hydroxides and certain reactive oxides which can be reacted with the alkyd to produce coatings. Illustrative of this specialized use may be found, for example, in the cobalt, manganese, calcium and lead adaptations of the invention wherein drying is enhanced when products made using these metals are blended with other varnishes to catalyze the drying rate of the varnishes to which they are added. Other specific indications are that copper and mercury treated alkyd resins of the class to which this invention is directed are useful as fungicides and mildewcides in paints intended for outside applications. Early indications suggest advantage in use of mercury modified alkyds in marine paints where antifouling of ships bottoms is a particular problem. Blends of copper and mercury are promising in this particular end use. Alkyd finishes containing these biocidal materials as an integral part of the vehicle component may also be found useful in coating of wall areas where food processing is carried on, such as bakeries and canneries. Here mildew and rope and other lower forms of life are apt to begin growth in and on the paint film and are known to be difficult to control when temperature and humidity conditions favor development.

Modified alkyd varnishes suitable for carrying out the purposes of this invention are well established in the art and need but little background to be set forth here. Modified alkyd resins suitable for the purposes of this invention are most generally oil modified alkyd resins. That is, they contain fatty acid groups of the class available from seed oils, marine oils, and the by-product from paper making known as tall oil. Tall oil also includes rosin acids as modifying agents for the alkyd resinous substance. Standard alkyd forming components, namely polyhydric alcohols and polycarboxylic acids and the useful members of these groups are so well established as not to need lengthy discussion. Generally speaking, the usual polybasic alcohols are glycols, glycerine and pentaerythritol. The usual polycarboxylic acid is phthalic anhydride. Other polycarboxylic acids may be used in minor amounts in conjunction with phthalic anhydride such as maleic and fumaric acids. Condensation products of maleic anhydride with, for example, cyclopentadiene, are also useful to form alkyd resins when combined with polyols. Alkyd resins so constituted are suitable for the purposes of this invention.

When rosin is used as a modifying component of the resin certain precautions have been found advisable to avoid unwanted use of the small amounts of added bivalent metal in reaction with the rosin in lieu of the metal reaction with the more complex resinous molecule. If the rosin is reacted with maleic acid or fumaric acid and tied up in the alkyd resin molecule, no difficulties have been observed. If the rosin is added as an ester, no problems develop. Even a pre-limed rosin appears to be satisfactory and limed rosins containing as much as 6% lime do not interfere.

The basic modified alkyd resins essential to the ends of this invention may be produced either by fusion process or by solvent cooking. When the fusion prosess is employed it has been found impractical to attempt to incorporate the bivalent metallic hydroxide directly into the fused modified alkyd resin. In such cases it appears to be impossible to afford sufficient contact between the solid and the liquid interface to obtain the necessary dual phase reaction. Further, insoluble metallic phthalates form more readily under these reaction conditions.

In order to overcome the problem of promoting the reaction between the solid phase metal hydroxide (or oxide), two essentials have been found. One is that the modified alkyd resin be in solution in a solvent. This is not a particular limitation, for in the protective and decorative coatings art, modified alkyds are normally employed in a reduced solids content form. A normal reduction with volatile solvent is on the order of 50%. Variation from this can be over an unlimited range as the percentage of solvent is increased—as in paper coatings. However, as the percentage of solids is increased above this point, the problems of promoting reaction between the metal and the modified alkyd resin are increased. One obvious reason is that as the reaction proceeds, viscosity of the liquid phase increases very rapidly. As viscosity increases, reaction rate diminishes rapidly. From this exposition it is not to be presumed that there is a critical point at 50% solids concentration, but merely that above this point the problems of reaction begin to become more and more complex. Reactions have been completed with attendant difficulty at 80% solids, for example.

A particularly critical factor in the successful practice of this invention was not at first recognized. In the early trials, all reactions were successfully carried out. However, in certain instances difficulty with promoting the reaction between the completed modified alkyd in solution and the bivalent metal hydroxide was experienced. In these cases it was found that the percentage of free hydroxyl groups present in the completed alkyd resin were very low—or non-existent. In such cases, the reaction rate behaves normally upon addition of from 0.05% to about 5% by weight of the alkyd solids of free glycerine to the modified alkyd. This addition appeared to cause the metal hydroxide to be "wetted" so that the bi-phase reaction would proceed smoothly.

In certain other instances, the amount of the polyol used in the original alkyd was increased slightly (from 0.05 to 5% of the total alkyd solids over standards in the formula) in cases where difficulty had been experienced. This method was also successful in all instances. In this latter series of experiments the nature of the polyol was not critical. In the experiments where the extra polyol was added subsequent to the cook, only glycerine appeared to be an effective agent.

More recently, in a third series of trial runs using alkyds wherein difficulty had been previously experienced, it was found that if the cure value in the initial alkyd cook was not taken down below about 10 and preferably maintained above 20, wetting of the bivalent metal hydroxide appeared to take place without difficulty.

In summary as to this point, most modified alkyds are formulated with sufficient excess polyol over stoichiometric equivalents to carboxyl groups so that little trouble is experienced. However, where the final cure value is low, addition of from 0.05 to 5% of glycerine by weight of resin solids at the end of the alkyd cook will promote essential wetting. If, in a particular case, cure value is not critical to the end use of the alkyd, the cook may be cut short—or arrested at a cure value in excess of 10 and preferably above 20 to overcome the problem. If free glycerine is objectionable in the final alkyd (before metallization), then one may increase the excess of the polyol used in the manufacture of the particular alkyd slightly to overcome the wetting difficulty—if such difficulty has been experienced.

In utilizing the above remedies, obviously some care should be exercised not to include too great a quantity of free hydroxyl groups or to have too much free hydroxyl in excess as this is known to inhibit drying of the modified alkyd and to contribute to poor water and alkali resistance of completed coating when deposited and in a dry film state.

The useful basically-reactive metal hydroxide-forming bivalent metal compounds for the purposes of the invention include barium hydroxide, calcium hydroxide, cadmium hydroxide, cobalt hydroxide, copper hydroxide, iron hydroxide, lead oxide, nickel hydroxide, strontium hydroxide, tin hydroxide, zinc hydroxide, etc. In certain instances it was found possible to use the oxides of the metals, although this use was accomplished under more drastic time and temperature conditions. Oxides of the bivalent metals capable of utilization for the purposes of this invention include magnesium oxide, calcium oxide, mercury oxide, and lead oxide as exemplary. The hydroxides should be used whenever possible as less difficulty is experienced.

It was also observed in certain instances and with certain hydroxides and oxides that reaction proceeded with greater facility at slightly higher temperatures. Initial reactions were completed by refluxing oil modified alkyd resins with a C-8 hydrocarbon solvent which gave reflux temperatures of approximately 175° F. Initially, reaction with colbalt, copper, nickel, strontium and zinc were difficult and slow at this temperature level. However, by using mineral spirits solvents and increasing the temperature of the refluxing alkyd to approximately 300° F. the named metals were observed to react to a sufficiently practical rate to form useful products. The particular project for which the end products of this invention were originally developed and intended required extremely rapid dry and hence had to include solvents which were freely and rapidly released from the film. This was the reason that temperatures of the order of 175° F. were extensively used in early tests. However, it is obvious in other instances that rapidly evaporating solvents may not be required and solvents having a higher boiling point are also applicable in the coatings art. Thus, in the practice of the invention it is preferred to use solvents which boil in a relative range of temperature for which the end product of the process is intended (150° to 350° F.). In other words, if the product is meant to dry very rapidly then a low boiling solvent having rapid solvent evaporation rate is selected and a metal hydroxide such as cadmium hydroxide or calcium hydroxide may be used. On the other hand, if one wishes to make a material modified with nickel, strontium, zinc, cobalt, or copper, it is preferable to use a solvent having a slightly higher boiling point and temperatures up to 325° F. have been satisfactory with these metal hydroxides. Thus, mineral spirits, which is commonly used in the paint industry, is adaptable when one wishes to make these metal modifications. Care should be exercised not to exceed about 350° F. in the metal-alkyd reaction for there is a tendency, in resinous alkyds made from phthalic anhydride, for the phthalic anhydride to break out of the reaction and to react with the bivalent metal ion to form insoluble phthalates. For example, calcium phthalate, if formed by excessive heating, serves no known useful purpose in modified alkyd coatings.

Thus, while the temperature of reaction is not critical, and covers a wide range of from about 125° to almost 400° F., preferred practice of the invention will be found in a range of temperature of from 150° to 350° F.

As previously indicated, the nature of the modifying component of the alkyd resin may, for example, be a drying oil fatty acid or non-drying oil fatty acid. If a material is desired for air dry purposes one selects an air drying fatty acid group as the modifier or fatty oil. If the end purpose of the modified alkyd resin is for use in a baking finish it is possible and satisfactory to use coconut fatty acids or other non-drying fatty acids or semi-drying fatty acids for baking purposes. These modifications and changes are well within the skill of the art. Other metals have been found adaptable for the purposes of this invention, but because of limitations either upon the temperature necessary for reaction or the nature of the films formed through their use, they are not considered equivalent to the bivalent basically reactive metallic ions here of interest. Presently known species of these metals are trivalent and include bismuth, antimony, aluminum and chromium. It appears that these are reactive only at temperatures above about 350° F. The monovalent alkali metals and ammonia, on the other hand, apparently react at room temperature and need little or no heating in order to affect combination. In the case of the alkali metals, however, the films are too soft to be useful of themselves for protective and decorative coatings use. Initial survey of the usefulness of these reaction products indicates it is possible that they will serve as plasticizing and bodying materals (as in silk screen work) in combination with other protective and decorative coatings where modifying agents are necessary in order to change the characteristics (e.g. flexibility, durability, etc.) of dry films deposited therefrom.

While we do not wish to be bound by theory, it is believed that reaction with bivalent hydroxide forming metal ions takes place through residual carboxyl groups of the formed modified alkyd resins. It is for this reason that we prefer the acid value of the initial alkyd to be in the range of from 25 to 50. At acid values above 50, reactivity appears to be excessive. In the practice of the invention it is not essential to use stoichiometric equivalents of the basic bivalent metallic hydroxide to the acid value of the resin. In fact, in some cases it is preferable to use something less than the quantity called for in such case, and to count upon some residual acid value remaining in the treated resin after processing in accordance with this invention. It is possible, of course, that the bivalent metal ion may also complex with free hydroxyl groups present in the resin. However, our experience indicates that the free hydroxyl groups may be present only in order that reactivity may be maintained between the free carboxyl groups of the alkyd and the bivalent metal hydroxides added.

It is obvious that the reaction time will vary with the conditions of the modified alkyds, the nature of the solvent, the temperature of the cook, the viscosity of the solvent-alkyd resin solution, the nature of the bivalent metal ion added and other numerous factors. As with the preparation of most varnish compositions, a little experience will establish the times necessary to produce the requisite characteristics in the resultant varnish product. Reaction time will vary from practically immediate or zero time, as in the case of the sodium ion, to several hours for less reactive metals. In general, it has been observed that the higher the melting point of the metal in general the longer the period of reaction time and the higher the temperature necessary to affect the combination between it and modified alkyd resins as described.

Useful solvents cover the gamut of solvents useful for the coatings art, but in general range from petroleum ether at the lower end of the boiling point range through toluene, low flash naptha, benzene, varnolene, V.M. & P. naptha, xylene, to—in some instances—kerosene, which is extremely slow as it is retained by the film for a long period of time.

As has been indicated, the oil length of the alkyd may be varied from approximatley 25 to 60 percent without interfering with the purposes for the process of this invention. In general, rosin modification can be included from zero to thirty percent provided, of course, that the rosin is tied up within the resin molecule in some way so as to be reduced in reactivity, as by adduct formation, esterification with the alkyd resin or esterification alone.

One of the odd and noteworthy pecularities about products of this invention is the capacity of those having zero cure value (which usually means a very high degree of cross linking and polymerization) to be thinned with mineral spirits. Mineral spirits have a relatively low kauri-butanol value. Normally a resin having a zero cure value can only be dispersed in very high KB (kauri-butanol numbers) solvents, if at all.

Although calcium oxide and magnesium oxide may be used for the purposes of this invention it has been found advisable, and in fact, necessary in most instances, that oxides have a very high ignition loss in order that the herein described reaction may be carried on. It is preferable in all instances to use the hydroxide rather than oxide of the metal. Again, however, certain hydroxides are not commercially available and we have had to resort to the oxide in order to produce the necessary combination of the bivalent metal ion with the alkyd resin.

The following examples are believed to illustrate the best method of practice of the invention and to illustrate advantages that are obtained by the process and the compositions as set forth.

EXAMPLE 1

Part A

A stainless steel kettle equipped with agitator, thermometer and inert gas dispensing valve was prepared to receive the following charge:

| | Parts |
|---|---|
| 1. Refined tall oil fatty acids (con't 35% rosin acids) | 285 |
| 2. Fumaric acid | 15½ |
| 3. Glycerine | 42½ |
| 4. Pentaerythritol | 22¼ |
| 5. Phthalic anhydride | 63½ |
| 6. Xylene | 76½ |
| 7. (8 carbon length) naphtha | 306 |

Items 1 and 2 are charged into the kettle and the temperature raised to 390° F. for diene addition. Hold 45 minutes. Sparge the melt with 10 c.f.m. inert gas until clear, increasing temperature to 425° F. Blowing discontinued. Blanket with inert gas. Add items 3, 4, and 5 and raise temperature to 440° F. Hold for 35 second cure. Fire off—fade heat to 400° F. Hold for 5–10 second cure and 32–36 A.V. Drop into 6, allow to cool to 250° C. and add 7.

Part B

A second stainless steel vessel, equipped with an agitator, thermometer and condenser was prepared to receive the following charge:

| | Parts |
|---|---|
| 1. Alkyd of Part A | 436 |
| 2. Glycerine | 2¼ |
| 3. C–8 naphtha #1 | 244 |
| 4. Lime | 4 |
| 5. C–8 naphtha #2 | 18½ |
| 6. Chlorinated wax | 20 |
| 7. Paraffin wax | 5 |

Add items 1, 2 and 3 to the vessel. Heat to 170° F. Add 4 slurried in 5. Hold for acid value of about 15 at 170° F. Add 6 and 7. Acid value drop to about 10. Hold for acid value of 8 to 9 and viscosity of T–U at 34% solids (Gardner-Holdt).

Evaluation of the vehicle resulting from Example 1 is as follows:

| | |
|---|---|
| Acid value | 8–9. |
| Cure | O. |
| Viscosity | T–U Gardner-Holdt. |
| Drying time (A.D.) (3 mil draw-down on gloss): | |
| Touch | 47 seconds. |
| Print free | 1 minute. |
| Through dry—dry hard | 1 hour. |
| Scuff resistance | Superior to plasticized vinyl chloride films. |

A one mil wet draw-down of the above vehicle further reduced to 25% solids with aromatic solvents and aliphatic solvents in a series of tests over post card stock disclosed no wicking or penetration of the vehicle into the porous stock. No wetting observed on the reverse side of the card indicating a very high molecular weight product. Even upon addition of tricresyl phosphate to the above varnish, no penetration was observable.

EXAMPLE 2

The following example is intended as comparative with Example 1, wherein the rosin acids present are substituted for with a limed rosin, and no lime as such, is added to the alkyd resin of Part A of Example 1.

|   | Parts |
|---|---|
| 1. Alkyd as in Example I(A) | 100 |
| 2. C-8 naphtha | 65¼ |
| 3. Limed rosin (6% lime) | 18¾ | were cold cut and then refluxed at 175°±10 F. for 1 hour in an agitated vessel to produce a varnish by a method and under processing conditions similar to those of Part B of Example I.

Upon examination of the characteristics of this vehicle, the following data was recorded.

| | |
|---|---|
| Acid value | 36. |
| Cure | 10 seconds. |
| Viscosity | W (Gardner-Holdt). |
| Drying time | 3 minutes—touch. |
| (3 mil on gloss): | |
| Print free | 6 minutes. |
| Through dry | 48 hours still pressure tack. |

In a post card test, the above coating showed immediate penetration of the paper fibre and wicking of the varnish as it spread outward from the wetted area.

EXAMPLE 3

Part A

A linseed-tall oil modified alkyd resin of approximately 41% oil modification was prepared by reacting together the following in equipment similar to that used in Example 1:

| | Parts by weight |
|---|---|
| Degummed linseed oil | 1240 |
| Acid refined tall oil | 1480 |
| Glycerine | 470 |
| Pentaerythritol | 506 |
| Lead naphenate catalyst dispersion | 2.5 |

The above ingredients were taken to 350° F. and held at this temperature for approximately one hour. Thereafter 1668 parts phthalic anhydride were added and a temperature of 400° F. gained. The batch was held at 400°±25° F. for an acid value of 30-35 and a cure value of 45-55 seconds. The resin was reduced with xylene to 49% solids.

The product resulting was very poor drying and would not dry kraft free in 24 hours.

Part B 1060 parts of the above solvent reduced alkyd were heated to reflux, and 21 parts lime (73% $Ca(OH)_2$) added slowly to the distilland. Water of reaction was removed in a side arm trap. Refluxing was continued to an acid value of 15 maximum and a cure value of zero.

With driers added, as in the untreated product, the set-to-tough time was reduced to 2 to 3 minutes and the film dried hard in 8 to 10 minutes.

EXAMPLE 4

An overall survey was made of readily available hydroxide-forming basically-reactive bivalent metals. Except in a few instances, as noted, the hydroxides were used in the following tests.

A stock solution was prepared containing 134 parts of the alkyd of Example 1, 70 parts of a C-8 naptha and 1 part glycerine.

To 1210 parts of the stock solution in each test the following metals were added:

| Test No. | Metal | Amount |
|---|---|---|
| 1 | $Ca(OH)_2$ | 9.5 |
| 2 | $Sr(OH)_2$ | 13.0 |
| 3 | HgO | 23.0 |
| 4 | PbO | 25.8 |
| 5 | $Cd(OH)_2$ | 15.7 |
| 6 | $Mg(OH)_2$ | 6.2 |
| 7 | $Cu(OH)_2$ | 10.4 |
| Control | | |

Each of the test solutions were refluxed at a temperature of 175°±10° F. to a cure value less than 10 seconds and in most cases the cure value approached zero value. In each instance the acid value fell off measurably, e.g. 30% or more. The change in drying rate is illustrated in part in the following table:

TABLE I

| Test No. | Metal | Touch Dry | Kraft Free |
|---|---|---|---|
| 1 | Ca | 45 seconds | 85 seconds. |
| 2 | Sr | 90 sec | 5 minutes. |
| 3 | Hg | 95 sec | 5¼ min. |
| 4 | Pb | 90 sec | 4½ min. |
| 5 | Cd | 45 sec | 85 sec. |
| 6 | Mg | 90 sec | 2' 45''. |
| 7 | Cu | 90 sec | 2' 45''. |
| Control | | 30 minutes | 2 hours, 30 minutes. |

EXAMPLE 5

In a similar series of tests to that of Example 4 a stock solution was prepared containing 134 parts alkyd of Example 1, 70 parts of mineral spirits boiling at 310°±10° F. Utilizing the following test materials, a higher reaction temperature was possible and proved more practical as the reaction in some instances was too slow at lower temperatures.

To 1210 parts of the above stock solution, in each test, the following metals were added:

| Test | Metal | Amount |
|---|---|---|
| 8 | $Mn(OH)_2$ | 9.5 |
| 9 | HgO | 23.0 |
| 10 | $Sr(OH)_2$ | 13.0 |
| 11 | $Zn(OH)_2$ | 10.6 |
| 12 | $Ba(OH)_2$ | 18.2 |
| 13 | $Co(OH)_2$ | 9.9 |
| 14 | $Ni(OH)_2$ | 9.8 |
| 15 | $Cu(OH)_2$ | 10.4 |
| 16 | $Ca(OH)_2$ | 8 |

Each of the test solutions were refluxed at a temperature of 310°±10° F. to a zero cure value. In each instance the acid value of the resin was less than before treatment. Selected tests are illustrated in comparison with the control in the following table:

TABLE II

| Test No. | Metal | Touch Dry | Kraft Free | Through Dry |
|---|---|---|---|---|
| 10 | Cobalt | 1 min.-50 sec | 11 min | 4 hours (max.). |
| 11 | Nickel | 15 min.-10 sec | 39 min | Do. |
| 12 | Copper | 7 min.-15 sec | 24½ min | Do. |
| 13 | Calcium | 1 min.-30 sec | 10 min | Do. |
| Control | | 30 min | 2½ hours | 24 hours |

It is to be observed in the data of Tables I and II and the test results there noted, considerable difference in the touch dry and kraft free times in calcium treated material under two different solvents. This difference, of course, is primarily due to the evaporation rate differences in the solvents used to cut the original alkyd resin solution for treatment purpose.

Usefulness of coating solutions as illustrated above and which can be produced using the process and compositions as set out is extremely broad and diversified.

The improved alkyd resin solution of Example 1, Part B has been developed into a paper coating for label varnish in which the trade has exhibited considerable interest. Fast dry and print resistance are essential to this end use. Lack of penetration is most unusual in this coating's use.

Interest has also been evidenced in compositions of the class illustrated for pipe coatings where the coating rate is of the order of 50 feet per minute.

Another promising end use is in line marking paints (traffic zone paints) where oil modified alkyds have heretofore required drying times impractical for present day traffic conditions. Here too, speed of dry and lack of penetration are the most interesting aspects of the compositions and methods described.

All the data is not yet at hand but exploratory tests indicate usefulness of the lead, manganese, cobalt, zinc and iron treated materials in contributing drier activity to other paints, varnishes and enamels with which they have been blended. In the case of the copper and mercury treated alkyds initial testing exhibits evidence of providing mildewcide and fungicidal activity. This quality is essential in many painting problems including bakery (anti-rope) finishes, outside house paints (mildewcide), marine finishes (antifouling) and in food processing plants (mold).

It will be observed in the above series that the amount used of any given metal is in proportion to its molecular weight—and in these examples is approximately equivalent—in turn—to the acid value of the demonstration alkyd.

Having described my improvements in modified alkyd resins for coating purposes and the process for their manufacture, I claim:

1. A method of improving the quality of a drying oil modified alkyd resin containing a stoichiometric excess of hydroxyl groups over carboxyl groups, an acid value in excess of 10 but not in excess of 50 and a cure value in excess of zero in solution in a volatile organic solvent which comprises adding to said resinous solution a quantity of an inorganic hydroxide-forming basically-reactive bivalent metal ion source available in said solution and sufficient to neutralize at least in part said acid value and heating said combination at a temperature of from 125° to 350° F. until the acid value and the cure value have been reduced to form a stable liquid product.

2. The method of claim 1, wherein the added bivalent metal ion is in the form of the metal hydroxide.

3. The method of claim 2, wherein the added bivalent metal hydroxide is an alkaline earth metal hydroxide.

4. The method of claim 3, wherein the alkaline earth metal hydroxide is calcium hydroxide.

5. The method of claim 1, wherein the added bivalent metal ion is zinc.

6. The method of claim 1, wherein the added bivalent metal ion is calcium.

7. The method of claim 1, wherein the added bivalent metal ion is mercury.

8. The method of claim 1, wherein the added bivalent metal ion is lead.

9. The method of claim 1, wherein the added bivalent metal ion is magnesium.

10. A method of treating a drying oil modified alkyd resin in solution in a solvent, said resin characterized by an acid value in excess of 10 but not in excess of 50 and a cure value in excess of zero and a concentration of less than 50% which comprises adding to said solution from 0.5 to 5% by weight of said resin of glycerine and a quantity of an inorganic hydroxide-forming basically-reactive bivalent metal ion source available in said solution and sufficient to neutralize in part said acid value and heating said combination at a temperature of from 150 to 350° F. until the acid value and the cure value have been reduced to form a stable liquid product.

11. The method of claim 10 wherein the added bivalent metal ion is in the form of the metal hydroxide.

12. The method of claim 11, where the added metal hydroxide is an alkaline earth metal hydroxide.

13. The method of claim 12, where the added metal hydroxide is calcium hydroxide.

14. A method of improving the quality of a drying oil modified alkyd resin which comprises adding to a preformed drying oil modified alkyd resin having an acid value in excess of 10 but not in excess of 50 and a cure value in excess of 10 in solution in a volatile organic solvent a quantity of an inorganic hydroxide forming basically reactive bivalent metal ion source available in said solution and sufficient to neutralize at least in part at said acid value and heating the combination but not above about 350° F. until the acid value and the cure value have been reduced to form a stable liquid product.

15. A method of improving the quality of a drying oil modified alkyd resin which comprises adding to a preformed drying oil modified alkyd resin having an acid value in excess of 10 but not in excess of 50 and a cure value in excess of 20 in solution in a volatile organic solvent a quantity of an inorganic hydroxide forming basically inactive bivalent metal ion source available in said solution and sufficient to neutralize at least in part said acid value and heating the combination but not above about 350° F. until the acid value and cure value have been reduced to form a stable liquid product.

References Cited in the file of this patent

UNITED STATES PATENTS

| | | |
|---|---|---|
| 1,885,027 | Patterson | Oct. 25, 1932 |
| 1,972,905 | Rosenblum | Sept. 11, 1934 |
| 2,001,525 | Coleman | May 14, 1935 |
| 2,056,656 | Ellis | Oct. 6, 1936 |
| 2,526,427 | Simon et al. | Oct. 17, 1950 |

OTHER REFERENCES

Pages 288, 289, 295 and 296, vol. 1, Payne, Organic Coating Technology, published 1954, by John Wiley and Sons, Inc., New York, N.Y.

Pages 61, 68 and 69, Gordon and Dolgin, Surface Coatings and Finishes published 1954, Chemical Publishing Co., Inc., New York, N.Y.

Pages 337, 338, pages 341 and 342, Official Digest, Federation of Paint and Varnish Production Clubs, No. 177, June 1938.